(12) United States Patent  
Omori (10) Patent No.: US 8,797,425 B2
(45) Date of Patent: Aug. 5, 2014

(54) IMAGE PICKUP APPARATUS AND CONTROL METHOD THEREOF FOR GENERATING AND RECORDING A PLURALITY OF IMAGE DATA IN DIFFERENT RECORDING FORMATS IN ONE-TIME IMAGE CAPTURING

(75) Inventor: Shuichi Omori, Oyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/273,950

(22) Filed: Oct. 14, 2011

(65) Prior Publication Data
US 2012/0033104 A1 Feb. 9, 2012

Related U.S. Application Data (63) Continuation of application No. 12/052,138, filed on Mar. 20, 2008, now Pat. No. 8,063,954.

(30) Foreign Application Priority Data

Apr. 5, 2007 (JP) ................. 2007-099745

(51) Int. Cl.
*H04N 5/76* (2006.01)
(52) U.S. Cl.
USPC .................................. 348/231.99; 348/222.1
(58) Field of Classification Search
CPC . H04N 5/232; H04N 9/7921; H04N 5/23245; H04N 2201/3297; H04N 2201/3288; H04N 21/418; H04N 21/4184
USPC ......... 348/231.99, 231.3, 231.8, 222.1, 220.1
See application file for complete search history.

(56) References Cited

U.S. PATENT DOCUMENTS

| 2004/0196389 A1* | 10/2004 | Honda ................. 348/231.7 |
| 2005/0012829 A1* | 1/2005 | Tashiro et al. ......... 348/231.99 |
| 2005/0141848 A1* | 6/2005 | Deguchi et al. ............ 386/1 |
| 2007/0216782 A1* | 9/2007 | Chernoff .............. 348/231.99 |

OTHER PUBLICATIONS

Pentax K10D Operating Manual (Publication Date on 2006).*
Canon EOS 20D Digital SLR Camera White Paper, 2004.*

* cited by examiner

*Primary Examiner* — Nelson D. Hernández Hernández
(74) *Attorney, Agent, or Firm* — Canon U.S.A., Inc. IP Division (57) ABSTRACT

An image pickup apparatus includes a recording-mode switching section for selecting a single-format recording mode in which recording is performed in one of recording formats or a multiple-format recording mode in which recording is simultaneously performed in a plurality of recording formats, and a recording-size setting section for setting a recording size of image data for each of the recording formats. If the multiple-format recording mode is set, and if a recording size is set to one of the recording formats, the recording size set by the recording-size setting section is set to all the recording formats recorded in one-time image capturing.

6 Claims, 6 Drawing Sheets

IMAGE PICKUP APPARATUS AND CONTROL METHOD THEREOF FOR GENERATING AND RECORDING A PLURALITY OF IMAGE DATA IN DIFFERENT RECORDING FORMATS IN ONE-TIME IMAGE CAPTURING

CROSS REFERENCE TO RELATED APPLICATIONS

The present application is a continuation of U.S. patent application Ser. No. 12/052,138, filed on Mar. 20, 2008, entitled "IMAGE PICKUP APPARATUS AND CONTROL METHOD THEREOF", the content of which is expressly incorporated by reference herein in its entirety. This application also claims the benefit of Japanese Application No. 2007-099745 filed Apr. 5, 2007, which is hereby incorporated by reference herein in its entirety.

BACKGROUND OF THE INVENTION

1. Field of the Invention

The present invention relates to an image pickup apparatus for generating and recording a plurality of image data in different recording formats in one-time image capturing and a control method thereof.

2. Description of the Related Art

For digital cameras, various recording formats are proposed for storing a still image obtained by electrically converting an analog signal obtained from image pickup devices, for example, charge-coupled device (CCD) sensors or complementary metal oxide semiconductor (CMOS) sensors, into digital data. In such digital cameras, it is common to compress the digital data obtained from the image pickup devices using a lossy algorithm, and store the compressed image data, whose data size is smaller than the original data size, into a recording medium. When image data is compressed, a processor specifically designed for image processing can adjust color tones or contrast so as to match a user's taste, and the size of an image or the compression ratio of the image can be set arbitrarily by the user. Thus, after the image is taken, there is no need to perform processing on the image data again with an application software program executed on a personal computer (PC). In addition, since the image data is compressed, more images can be stored in the recording medium. That is, more pictures can be taken. Joint Photographic Experts Group (JPEG) format is widely used as a major compression format.

On the other hand, a non-compressed format (hereinafter referred to as RAW format or RAW data) in which digital data converted from an analog electric signal supplied from image pickup devices is simply stored into a recording medium is also used. In this format, since the digital data is not compressed, after an image is taken, a user can arbitrarily set and adjust, for example, color tones, brightness, saturation, and contrast by using an application software program executed on a PC. Thus, defects in the taken image can be retouched, and moreover the taken images can be corrected or modified in a more flexible manner. Assuming that a similar image correction operation is performed on the compressed image data, compared with the case of RAW data, not only are the possible types of processing limited but also such processing may greatly degrade the compressed image data. This is because when the original image data is compressed to obtain the compressed image data, a large amount of original image data information is lost.

However, there is a problem that a file size of image data is larger in RAW format than in a compressed format. Thus, the number of image data capable of being stored in a recording medium is limited. Since an image file in RAW format is large, such an image file requires a longer time to be recorded in the recording medium. In order to solve this problem, recently, a digital camera has been developed which is capable of changing the size of image data in RAW format by performing a data processing operation before and after taking the image. For such a digital camera, the setting can be changed in response to a purpose of taking an image or the capacity of a recording medium, and thus the degree of freedom in taking the image is improved.

Japanese Patent Laid-Open No. 2004-260813 discloses a technology of reducing a resolution (the number of pixels) of RAW data. According to this, the size of RAW data can be reduced to a size specified by a user, and thus the file size required for the RAW data is reduced and the writing speed for the reduced file is increased. Both RAW data and compressed data have advantages and disadvantages, and many proposals for reducing the disadvantages have been made.

Many formats are available for recording data, and some digital cameras can simultaneously record image data in two recording formats when taking an image. Relatively many users use this mode since RAW data and compressed data can be simultaneously recorded in one-time image capturing. Moreover, since recording formats and the size of image data can be arbitrarily set, file management can be performed flexibly in response to a photographer's purpose or the capacity of a recording medium.

However, if each of RAW format, JPEG format, and the like has many image-size choices, the number of combinations of image size and format greatly increases. In particular, in the case of recording image data in a plurality of formats simultaneously, a user is required to select a desired combination, which serves as a desired setting, among many combinations. As a result, the usability of such a system decreases even though the user has more choices regarding format and image size. In addition, since specifying the setting is complicated, there are the following disadvantages for users. For example, users may miss releasing the shutter at the right moment or select an undesired setting.

SUMMARY OF THE INVENTION

An aspect of the present invention provides an image pickup apparatus for generating and recording a plurality of image data in different recording formats in one-time image capturing. The image pickup apparatus includes a size setting unit configured to set a recording size of image data in one of different recording formats among a plurality of image data in the different recording formats, the image data in the different recording formats being generated in one-time image capturing, and a setting changing unit configured to, if a recording size of image data in one of the different recording formats is set by the size setting unit, change the setting of image data in at least one different recording format, the image data in the at least one different recording format being recorded in the one-time image capturing, such that the recording size set by the size setting unit is set for a recording size of the image data in the at least one different recording format.

Further features and aspects of the present invention will become apparent from the following description of exemplary embodiments with reference to the attached drawings.

DESCRIPTION OF THE EMBODIMENTS

In the following, various embodiments, features and aspects of the present invention will now herein be described in detail with reference to the attached drawings.

The embodiments described below are intended to illustrate an example of the present invention. Therefore, it is understood that various changes and modifications can be made without departing from the spirit and scope of the invention, and the present invention is not intended to be limited to the following embodiments.

Example Camera Structure

Figure 1A:
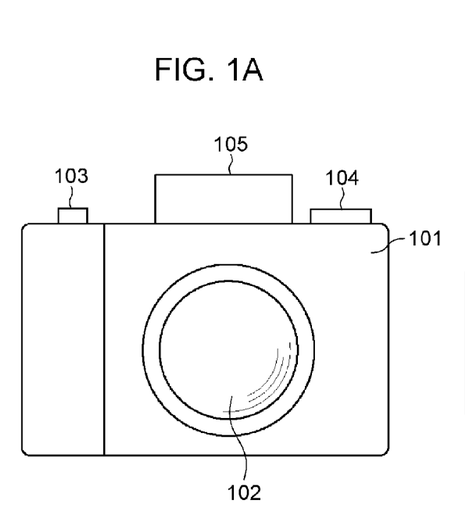
FIG. 1A is a schematic front view showing an external structure of an example digital camera according to an exemplary embodiment of the present invention.
Figure 1B:
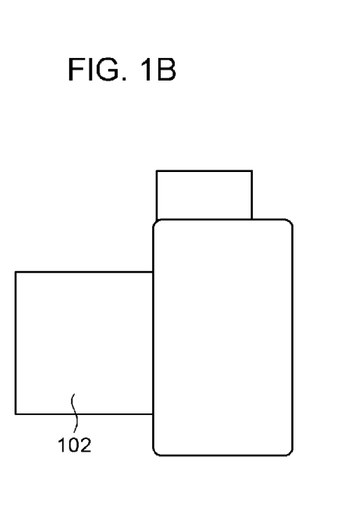
FIG. 1B is a schematic side view showing the external structure of the digital camera according to the embodiment of the present invention.
Figure 1C:
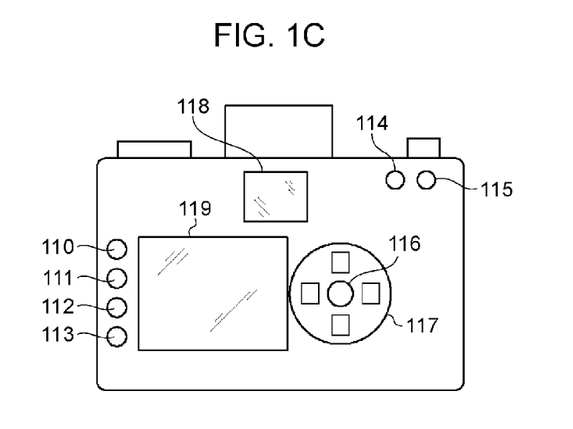
FIG. 1C is a schematic back view showing the external structure of the digital camera according to the embodiment of the present invention.

FIGS. 1A, 1B, and 1C are a front view, a side view, and a back view, respectively, showing an external structure of a digital camera according to an embodiment of the present invention. FIG. 1 show a camera unit 101, a lens member 102, and a strobe light unit 105.

The camera unit 101 includes a shutter release button 103, a mode-setting dial 104 for selecting a shooting mode, a liquid crystal display (LCD) panel 119 for displaying a taken image, and an optical viewfinder 118. The camera unit 101 also includes a button 114 for performing an autoexposure (AE) lock function and for performing a zoom-out operation on images, a button 115 for performing an autofucusing function and for performing a zoom-in operation on images, cross-arrangement buttons 117, and a confirmation button 116 for executing a menu item. In addition, the camera unit 101 includes a button 110 for displaying a menu, a button 111 for switching between the display of and the non-display of file information, a button 112 for displaying an image after skipping a predetermined number of images, and a delete button 113.

Figure 2:
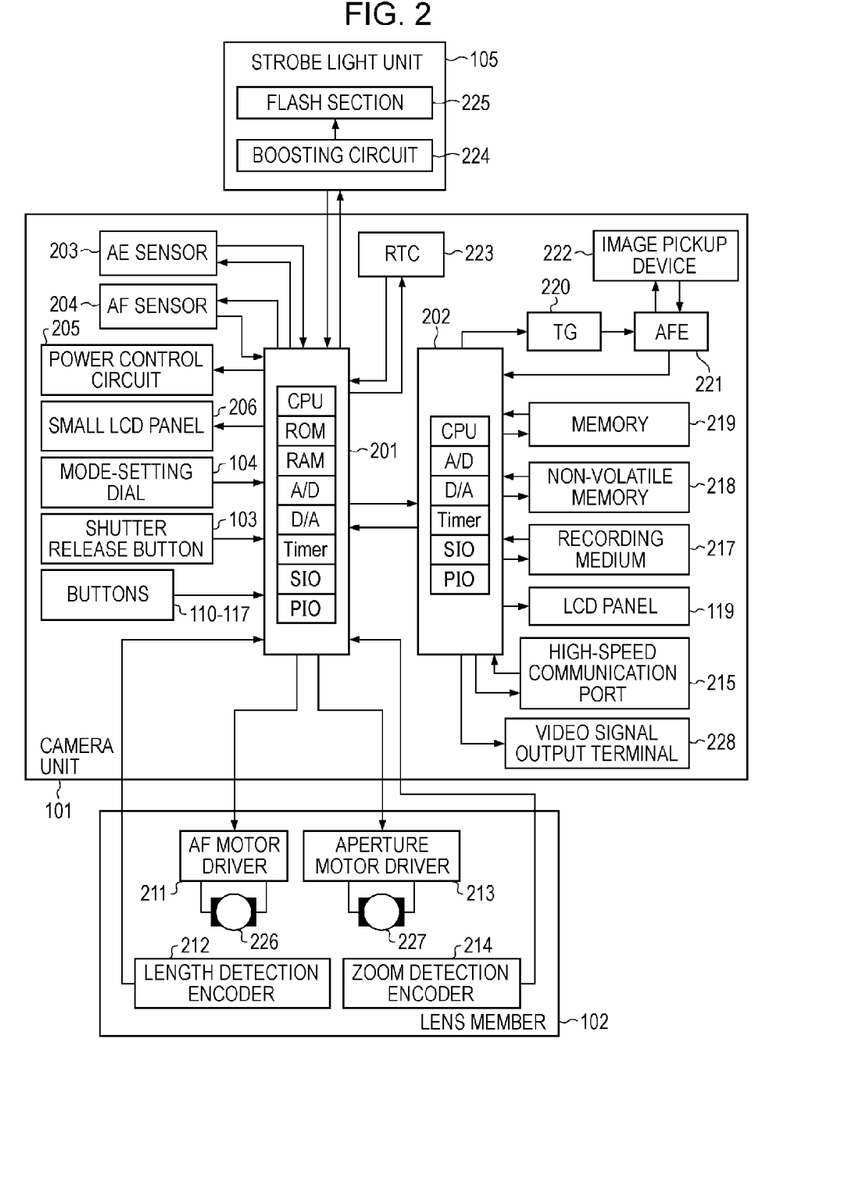
FIG. 2 is a schematic block diagram showing electrical structures of a camera unit, a lens member, and a strobe light unit and showing signal flows.

FIG. 2 is a schematic block diagram showing electrical structures of the camera unit 101, the lens member 102, and the strobe light unit 105 and showing signal flows.

In FIG. 2, a camera control microprocessor 201 is a one-chip microprocessor including a central processing unit (CPU), a read-only memory (ROM), a random access memory (RAM), an analog-to-digital (A/D) converter, a digital-to-analog (D/A) converter, a timer, a serial input/output (SIO) port, a parallel input/output (PIO) port, and the like. The camera control microprocessor 201 has control over the entire camera.

An autofocusing (AF) sensor 204 is a focus detection sensor that detects a distance between the digital camera and the subject whose image is to be taken. An AE sensor 203 is a light-intensity detection sensor for detecting subject brightness. Output signals supplied from the AF sensor 204 and the AE sensor 203 are input to the A/D converter of the camera control microprocessor 201 and converted into digital data. Then, certain processing is performed on the digital data inside the camera control microprocessor 201.

A power control circuit 205 supplies power to sections provided in the camera unit 101 in accordance with a command sent from the camera control microprocessor 201. A small LCD panel 206 displays, for example, the number of images taken, date information, and exposure information. Reference numeral 103 denotes a shutter release button, reference numeral 104 denotes a mode-setting dial, and reference numerals 110 through 117 denote buttons. A real-time clock (RTC) 223 is used when the camera control microprocessor 201 obtains information regarding, for example, date and time when an image is taken.

An image processing microcomputer 202 is a one-chip microcomputer specifically designed for image processing. The image processing microcomputer 202 includes, similarly to the camera control microprocessor 201, a CPU, an A/D converter, a D/A converter, a timer, an SIO, a PIO, and the like.

The image processing microcomputer 202 controls a timing generator (TG) 220 in accordance with a command sent from the camera control microprocessor 201. The TG 220 adjusts the timing of operating an analog front end (AFE) 221 and the timing of operating an image pickup device 222 including a photoelectric conversion element such as a CCD such that the image processing microcomputer 202 can smoothly receive and send imaging data. The AFE 221 has a function of converting an analog signal output from the image pickup device 222 into digital data, and performing correction processing on the digital data at the same time. An imaging signal output from the image pickup device 222 is converted by the AFE 221 into digital data and buffered temporarily in a memory 219.

The memory 219 is a large-capacity volatile memory capable of being accessed at a high speed, for example, a synchronous dynamic random access memory (SDRAM). A recording medium 217 is, for example, a memory card such as a CompactFlash® card or a small hard disk. The recording medium 217 is detachable from the camera unit 101, and can carry data if the recording medium 217 is mounted in or connected to another apparatus such as a PC or a printer. A non-volatile memory 218 is a flash ROM. In the non-volatile memory 218, a boot program required when starting or resetting the image processing microcomputer 202 is stored.

A display apparatus such as the LCD panel 119 displays an image taken. A video signal output terminal 228 is used to output an analog video signal. A high-speed communication port 215 is used for connection with a peripheral apparatus such as a printer or a PC.

In the lens member 102, an AF motor driver 211 drives an AF motor 226 used for performing AF adjustment. An aperture motor driver 213 drives an aperture motor 227 used for controlling the aperture. A length detection encoder 212 converts a travel of an AF adjustment lens into an electric signal, and the length information is input to the camera control microprocessor 201. When the lens member 102 is a zoom lens, a zoom detection encoder 214 is used to obtain information regarding the focal length when an image is taken, and the information regarding the focal length is input to the camera control microprocessor 201. The camera control microprocessor 201 performs focus detection processing or exposure computing processing, controls the AF motor driver 211 on the basis of the resulting focus information or aperture information, and controls the aperture motor driver 213 on the basis of the aperture information.

The strobe light unit 105 includes a flash section 225 typified by a xenon tube and a boosting circuit 224 that generates a high voltage of about 300 V needed to perform a flash operation. The operation of the above-described camera will now herein be described.

If a camera is pointed at a subject through the optical viewfinder 118, and the shutter release button 103 is half-pressed, appropriate distance and aperture information is output to the camera control microprocessor 201 from the AF sensor 204 and the AE sensor 203. The camera control microprocessor 201 drives the AF motor 226 and the aperture motor 227 via the AF motor driver 211 and the aperture motor driver 213 in accordance with the focus information and aperture information resulted from computing, and controls the lens and the aperture to be at appropriate positions. If a user sees the state of framing, focusing, and exposure through the optical viewfinder 118 and finds no problem, the user further presses the shutter release button 103 and the image of the subject at the moment is taken from the image pickup device 222.

The image of the subject entered through the lens member 102 is formed on the image pickup device 222 and photoelectric conversion is performed. The electric signal obtained by performing the photoelectric conversion is converted into a digital signal by the AFE 221 and the digital signal is output to the image processing microcomputer 202. The data input to the image processing microcomputer 202 is temporarily buffered in the memory 219, and image processing is sequentially performed by the image processing microcomputer 202. Afterwards, the resulting data is resized to the display size of the LCD panel 119, and displayed as an image. At the same time, the resulting data is stored in the recording medium 217 in a preset arbitrary recording format.

A recording format in the case of recording certain information into the recording medium 217 can be selectable between a single-format recording mode and a multiple-format recording mode. In the single-format recording mode, a taken image is converted into image data in one of JPEG format or RAW format and the converted image data is recorded. In the multiple-format recording mode, a taken image is converted into image data in JPEG format and image data in RAW format, and both image data are simultaneously recorded as one file or separate files. Regarding the recording modes, a user can arbitrarily set either one of the recording modes prior to taking an image.

Figure 3:
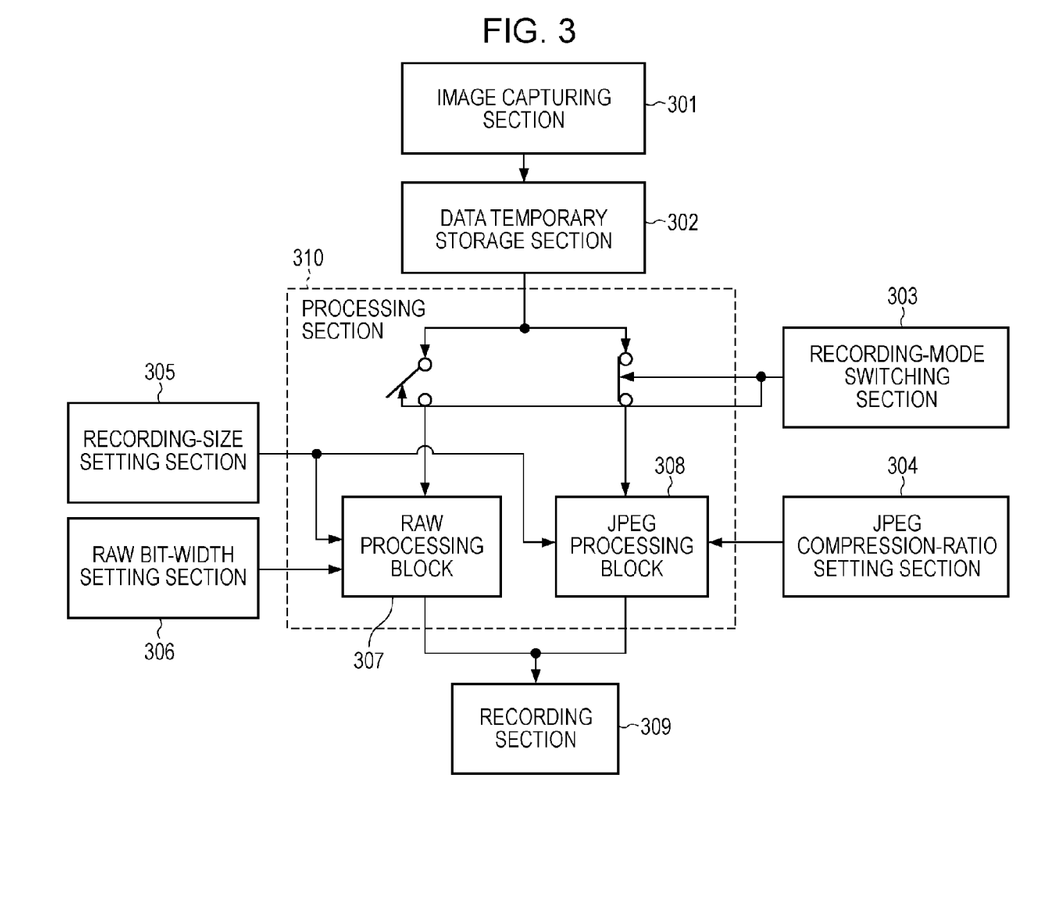
FIG. 3 is a schematic block diagram showing the relationship between functional blocks in an image processing microcomputer and blocks around the image processing microcomputer.

FIG. 3 is a schematic block diagram showing the relationship between functional blocks in the image processing microcomputer 202 and blocks around the image processing microcomputer 202.

In FIG. 3, an image capturing section 301 includes the TG 220, the AFE 221, and the image pickup device 222 shown in FIG. 2. A data temporary storage section 302 includes the memory 219. A recording-mode switching section 303, a JPEG compression-ratio setting section 304, a recording-size setting section 305, and a RAW bit-width setting section 306 have a function of performing a setting operation by controlling the buttons 110 through 117 in accordance with a menu interface displayed on the LCD panel 119. A processing section 310 performs processing that corresponds to the processing performed by the image processing microcomputer 202. A recording section 309 includes, for example, the recording medium 217 and an external device, such as a PC, for storing image data sent via the high-speed communication port 215.

The image capturing section 301 converts image data into a digital signal, and the digital image data is buffered by the data temporary storage section 302. The buffered image data is supplied to the processing section 310, and a RAW processing block 307 and/or a JPEG processing block 308 perform/performs data-conversion processing appropriate for their recording formats/its recording format on the buffered image data. Processing for changing the bit width of RAW data is performed when this data-conversion processing is performed.

Here, the recording-mode switching section 303 performs setting of the single-format recording mode or the multiple-format recording mode (a mode selection unit or a mode selection step). The JPEG compression-ratio setting section 304 performs setting of a compression ratio of JPEG format. The recording-size setting section 305 performs setting of a recording size of the image data (a size setting unit or a size setting step). The RAW bit-width setting section 306 performs setting of a bit width of the image data. The processing section 310 performs a processing operation in accordance with these settings, and the image data is stored in the recording section 309.

Next, the setting processing of a recording size regarding image data taken in the multiple-format recording mode will be described for a case where the image data is taken using a camera with the above-described structure and functions.

First Exemplary Embodiment

Figure 4:
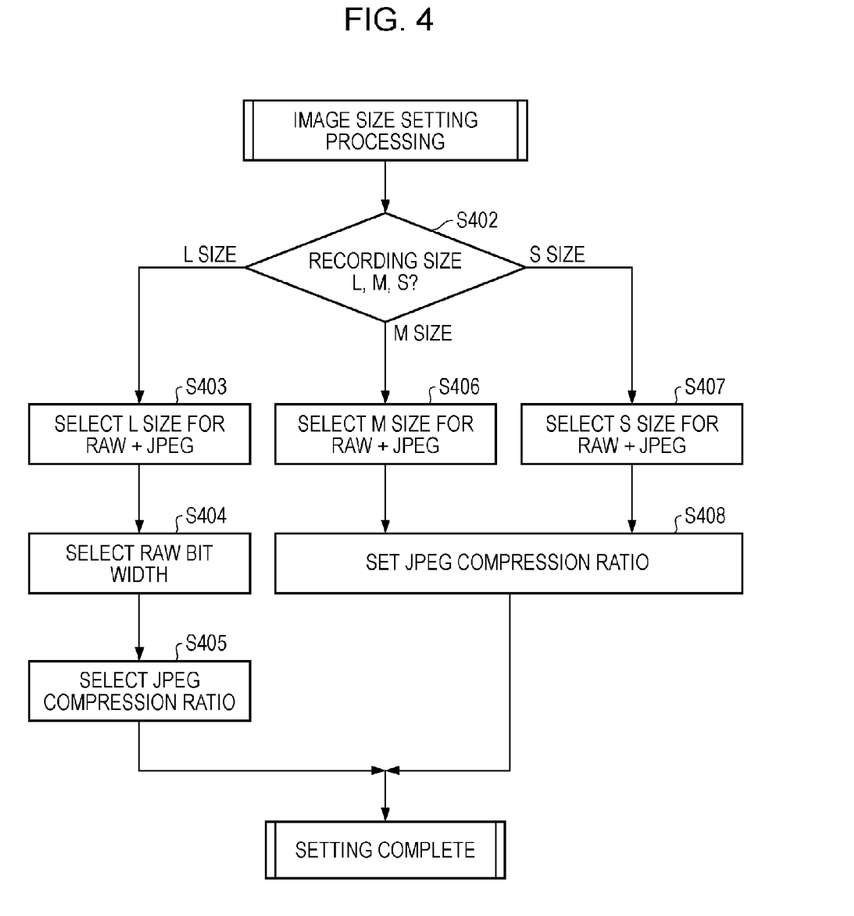
FIG. 4 is a flowchart showing example processing of setting a recording size according to a first exemplary embodiment of the present invention.

FIG. 4 is a flowchart showing processing of setting a recording size according to a first embodiment of the present invention. In the following, it is assumed that a user operates the cross-arrangement buttons 117 and the confirmation button 116, and the multiple-format recording mode is set by the recording-mode switching section 303.

Figure 5A:
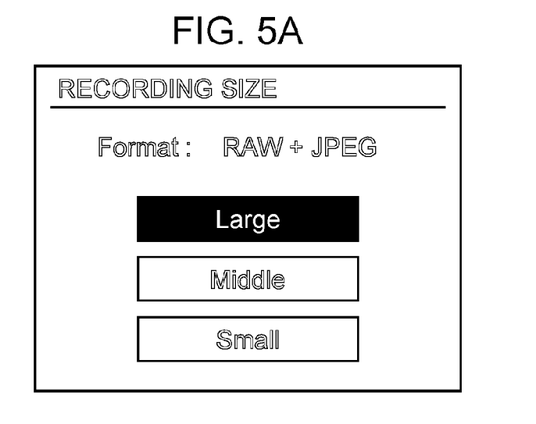
FIG. 5A is a diagram showing an example interface for setting a recording size.

The user operates the button 110 and causes a recording-size setting user interface for the multiple-format recording mode to be displayed. This starts image-data recording-size processing shown in FIG. 4. Here, a user interface (UI) as shown in FIG. 5A is displayed on the LCD panel 119, and the user selects a desired recording size by operating the confirmation button 116 (step S402). Here, the recording size indicates the number of pixels used to record image data. For example, in the case of an 8-megapixel digital camera, L size is fixed to 3504×2336 pixels, M size is fixed to 2544×1696 pixels, and S size is fixed to 1728×1152 pixels.

If the selected recording size is M or S (step S406 or step S407), a processing parameter for M size or a processing parameter for S size is selected for both RAW format and JPEG format. At the same time, a JPEG compression ratio is fixed to an appropriate value in order to avoid generating files of unwieldy size (step S408). The setting of the recording size and the setting of the JPEG compression ratio in steps S406 through S408 are automatically performed by the recording-size setting section 305 and the JPEG compression-ratio setting section 304 shown in FIG. 3 (a setting changing unit or a setting changing step).

As described above, the setting of the recording size to M or S is complete. Similarly, if the selected recording size is L (step S403), a processing parameter for L size is selected for both RAW format and JPEG format. In the case of L size, for example, the setting for a high-quality image mode is also considered. Thus, with respect to RAW data, a bit width for the data obtained after a sensor output signal is converted from analog to digital can be selected (step S404). With respect to JPEG data, a compression ratio can be selected (step S405). The setting of the recording size, the setting of the bit width of the RAW data, and the setting of the JPEG compression ratio in steps S403 through S405 are performed by the recording-size setting section 305, the RAW bit-width setting section 306, and the JPEG compression-ratio setting section 304 shown in FIG. 3 in accordance with operations of the cross-arrangement buttons 117 and the confirmation button 116 performed by the user.

As described above, the setting of the recording size to L is complete.

Figure 5B:
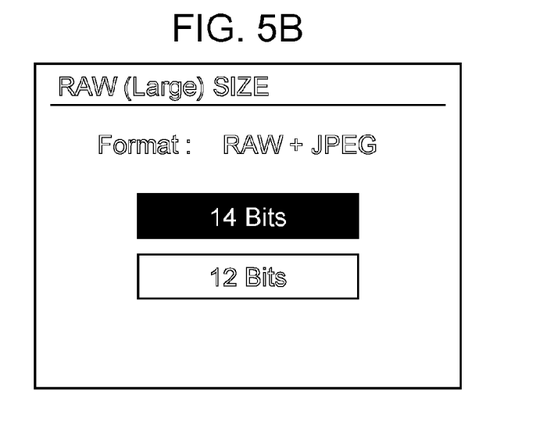
FIG. 5B is a diagram showing an example interface for setting a bit width of RAW data.
Figure 5C:
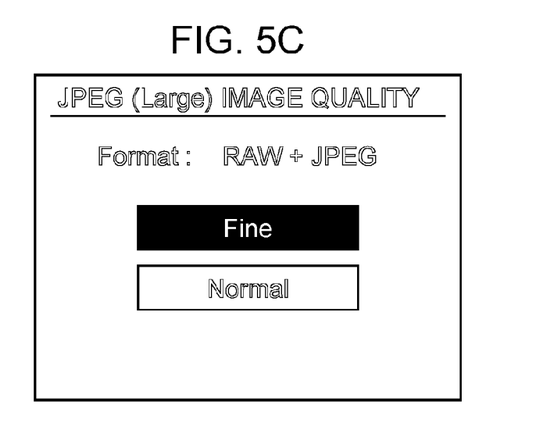
FIG. 5C is a diagram showing an example interface for setting a JPEG compression ratio.

Here, a UI as shown in FIG. 5B is displayed on the LCD panel 119 when a bit width of RAW data is set, and a UI as shown in FIG. 5C is displayed on the LCD panel 119 when a JPEG compression ratio is selected. This is user-friendly.

With respect to the bit width shown in FIG. 5B, a 14-bit width or a 12-bit width can be set. With respect to the JPEG compression ratio shown in FIG. 5C, Fine (a low compression ratio) or Normal (a normal compression ratio) can be set.

Second Exemplary Embodiment

A method of setting a recording size according to a second embodiment will be described.

Figure 6:
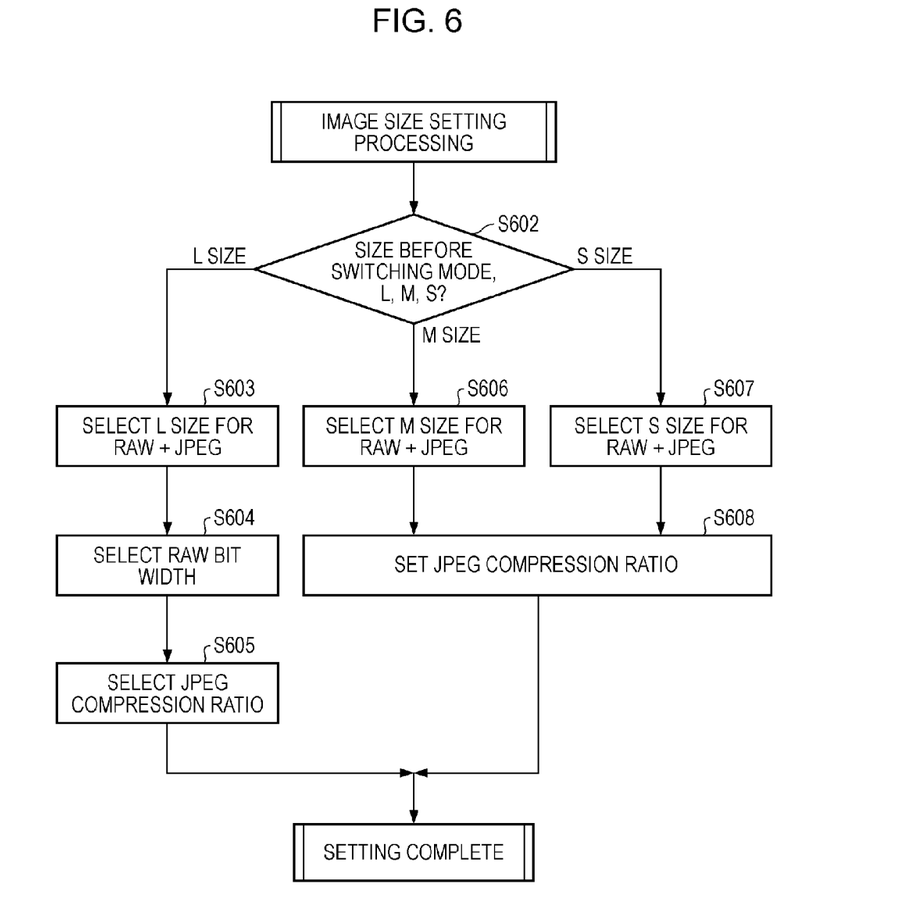
FIG. 6 is a flowchart showing processing of setting a recording size according to a second exemplary embodiment of the present invention.

FIG. 6 is a flowchart showing processing of setting a recording size according to the second embodiment. Note that a camera structure, a photographing operation, and a processing operation are similar to those described in the first embodiment. In the following, it is assumed that an image has been taken in the single-format recording mode before switching to the multiple-format recording mode.

The user operates the cross-arrangement buttons 117 and the confirmation button 116 and causes the recording-mode switching section 303 to switch from the single-format recording mode to the multiple-format recording mode. This starts image-data recording-size processing as shown in FIG. 6.

When the recording mode is switched, the camera control microprocessor 201 first determines the recording size set during the single-format recording mode (step S602). If M or S size has been selected as the recording size before switching the recording mode (step S606 or S607), a processing parameter for the size selected is selected for both RAW format and JPEG format. At the same time, similarly to the first embodiment, a JPEG compression ratio is fixed to an appropriate value in order to avoid generating files of unwieldy size (step S608). The setting of the recording size and the setting of the JPEG compression ratio in steps S606 through S608 are automatically performed by the recording-size setting section 305 and the JPEG compression-ratio setting section 304 shown in FIG. 3 (a setting changing unit or a setting changing step).

As described above, the setting of the recording size to M or S is complete.

Similarly, if L size has been selected as the recording size before switching to the multiple-format recording mode (step S603), a processing parameter for L size, which is the same as the recording size selected before switching the recording mode, is selected for both RAW format and JPEG format. In the case of L size, for example, the setting for a high-quality image mode is also considered. Thus, with respect to RAW data, a bit width for the data obtained after a sensor output signal is converted from analog to digital can be selected (step S604). With respect to JPEG data, a compression ratio can be selected (step S605). The setting of the recording size, the setting of the bit width of the RAW data, and the setting of the JPEG compression ratio in steps S603 through S605 are performed by the recording-size setting section 305, the RAW bit-width setting section 306, and the JPEG compression-ratio setting section 304 shown in FIG. 3 in accordance with operations of the cross-arrangement buttons 117 and the confirmation button 116 performed by the user.

As described above, the setting of the recording size to L is complete.

Here, similarly to the first embodiment, a UI as shown in FIG. 5B is displayed on the LCD panel 119 when a bit width of RAW data is set, and a UI as shown in FIG. 5C is displayed on the LCD panel 119 when a JPEG compression ratio is set. This is user-friendly.

In the above-described embodiments, if the setting of the recording size is S or M, the JPEG compression ratio is fixed to an appropriate value in accordance with a purpose of use or frequency in utilization; however, such a JPEG compression ratio may be variable.

Other Exemplary Embodiments

The present invention can be realized in the following way. A storage medium (or a recording medium) in which program code of software realizing a function according to the above-described embodiments is recorded is mounted into a system or an apparatus. A computer (or a CPU or an MPU) of the system or apparatus reads and executes the program code stored in the storage medium. In this case, the program code read from the storage medium realizes the function of the above-described embodiments, and thus the present invention can be realized by the storage medium in which the program code is stored. Moreover, the present invention can be realized not only in the case in which the function is realized by executing the program code read by the computer but also in the following case. For example, an operating system (OS) running on a computer may perform a partial or entire actual processing operation on the basis of an instruction generated from the program code, and the function of the above-described embodiments is realized by the processing operation performed by the OS.

Moreover, the present invention can also be realized in the following case. The program code read from the storage medium is written to a memory provided in a function expansion card inserted into the computer or in a function expansion unit connected to the computer. Afterwards, for example, a CPU provided in the function expansion card or function expansion unit performs a partial or entire actual processing operation on the basis of an instruction generated from the program code, and the function of the above-described embodiments is realized by the processing operation performed by the CPU.

If the present invention is realized by using the storage medium, program code corresponding to the above-described steps is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An image pickup apparatus for generating and recording a plurality of image data in different recording formats in one-time image capturing, the apparatus comprising:
a mode selection unit configured to select a single-format recording mode in which recording is performed in one of the different recording formats, or a multiple-format recording mode in which recording is simultaneously performed in a plurality of recording formats;

a setting unit configured to, if the single-format recording mode is selected by the mode selection unit, set a recording condition related to a recording size and compression ratio of image data recorded in the single-format recording mode; and a controlling unit configured to, if the mode selection unit changes a mode setting from the single-format recording mode to the multiple-format recording mode, automatically set the recording size of image data recorded in the recording formats different from the image data format recorded in the single-format recording mode, according to the setting set by the setting unit, and set the compression ratio of image data recorded in the recording formats different from the image data format recorded in the single-format recording mode, not according to the setting by the setting unit.

2. The image pickup apparatus according to claim 1, wherein the plurality of recording formats include at least JPEG format.

3. The image pickup apparatus according to claim 1, wherein the controlling unit controls whether to allow a user for selecting the setting of the compression ratio of image data recorded in the recording formats different form the image data format recorded in the single-format recording mode, if the mode selection unit changes a mode setting from the single-format recording mode to the multiple-format recording mode according to the recording condition set in the single-format recording mode by the setting unit.

4. A method of controlling an image pickup apparatus for generating and recording a plurality of image data in different recording formats in one-time image capturing, the method comprising:

selecting a single-format recording mode in which recording is performed in one of the different recording formats, or a multiple-format recording mode in which recording is simultaneously performed in a plurality of recording formats;

setting, if the single-format recording mode is selected in the selecting step, a recording size and compression ratio of image data recorded in the single-format recording mode; and controlling, if the mode is changed from the single-format recording mode to the multiple-format recording mode in the selecting step, to automatically set the recording size of image data recorded in the recording formats different from the image data format recorded in the single-format recording mode according to the setting in the setting step, and the compression ratio of image data recorded in the recording formats different from image data format in single-format recording mode not according to the setting the setting step.

5. The method of controlling an image pickup apparatus according to claim 4, wherein the plurality of recording formats include at least JPEG format.

6. The method of controlling an image pickup apparatus according to claim 4, wherein in the controlling step, it is controlled whether a user can select the setting of the compression ratio of image data recorded in the recording formats different from the image data format in the single-format recording mode when the mode is changed from the single-format recording mode to the multiple-format recording mode according to the recording condition related to a recording size in the single-format recording mode set in the setting step.

\* \* \* \* \*